Oct. 20, 1936. A. G. REDMOND 2,058,109
ELECTRIC MOTOR AND METHOD OF MAKING IT
Filed June 21, 1935
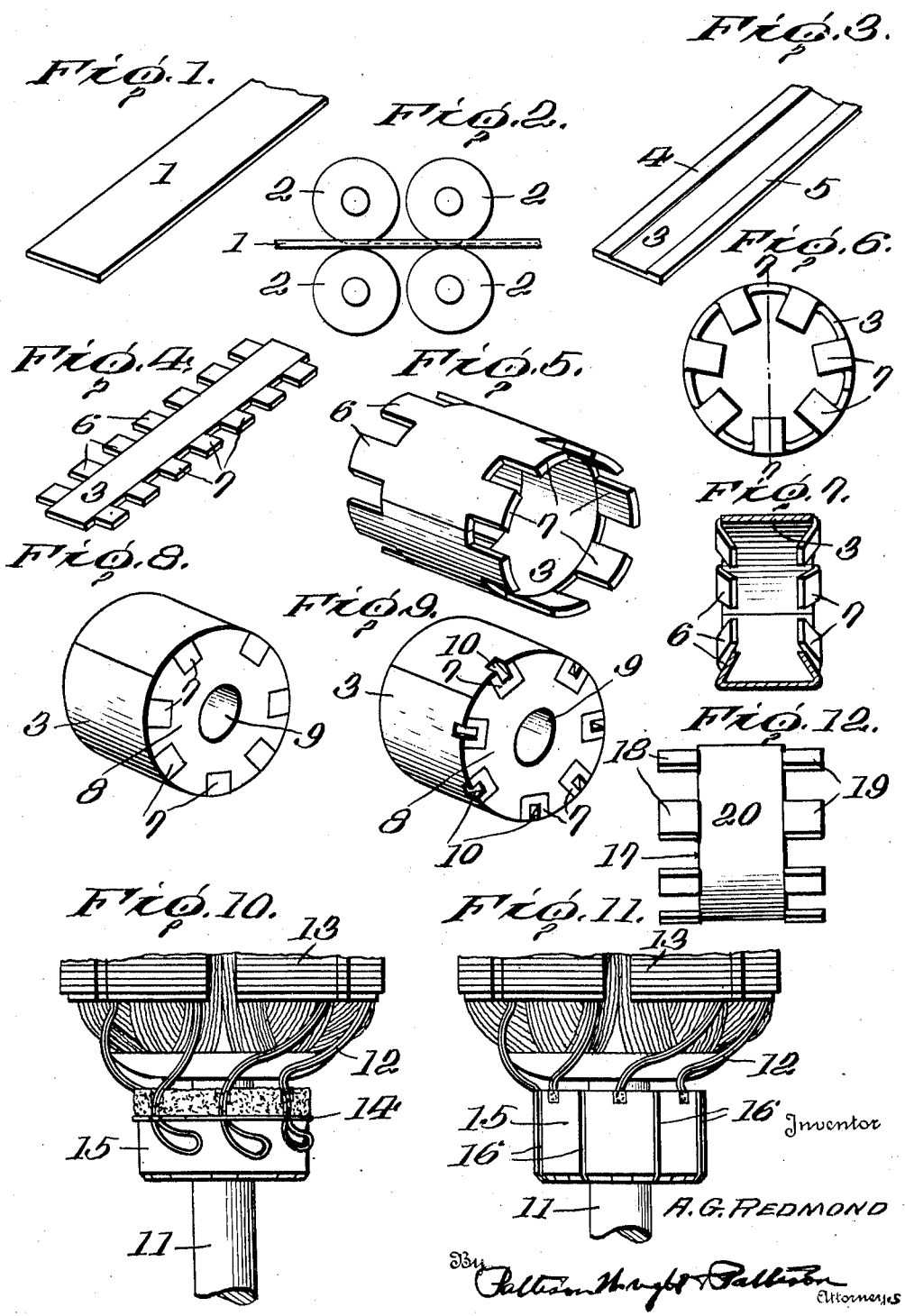

Patented Oct. 20, 1936

2,058,109

UNITED STATES PATENT OFFICE 2,058,109

ELECTRIC MOTOR AND METHOD OF MAKING IT

Albert G. Redmond, Flint, Mich.

Application June 21, 1935, Serial No. 27,802

5 Claims. (Cl. 171—321)

This invention relates to a method of making electric motors and more particularly to a method of making small motors in which the commutator is formed of a cylinder divided to produce commutator bars, the object being to provide an electric motor which can be manufactured very cheaply and one in which this type of commutator will have all of the advantages as what is known in the art as the segmental type.

In manufacturing small commutators of the Apple type as disclosed in his Patent No. 1,578,793, dated March 30, 1926, it is necessary to form the cylinder from which the commutator bars are produced, of soft copper in order to allow the teeth or tongues to be bent inwardly to anchor the commutator bars on the insulating body which is molded therein before the cylinder is divided into commutator bars.

The main object of my invention is to provide a method by means of which a cylinder of copper or analogous material can be formed with a hard face having soft or more pliable teeth along its edges in order to allow these teeth or tongues to be bent inwardly towards the axis of the cylinder and towards one another without any danger of breaking the same and to provide means for anchoring the commutator bars on the circumference of the insulating body which is preferably formed of bakelite.

I have found in the manufacture of commutators for electric motors of the Apple type, that it is necessary to maintain a razor-like edge on a tool used for finishing and turning the commutator after it has been formed as the soft copper chips want to turn down into the slots and due to the soft copper, it is practically impossible to make a clean cut as the copper causes the tool to jump each time it passes over one of the slots which produces a commutator more or less lumpy instead of perfectly round and when employed in an electric motor turning over 2500 R. P. M., a commutator which is not absolutely true will set up brush vibrations which are very undesirable.

I have found that by hardening the commutator face on the commutator and leaving the material from which the ears or teeth are formed soft and pliable, these teeth or ears can be bent inwardly to form the anchors without any danger of breaking the same.

I have found that by placing the copper under pressure by passing the same through rolls, the material from which the cylinder is formed can be hardened from what is known as No. 1 hard to what is known as No. 3 hard, which is sufficient to allow the true turning of the cylinder to produce the commutator bars thereby producing a commutator which overcomes all the difficulties now existing with prior constructions of this type.

My method also includes novel means for securing the lead wires from the armature to the commutator bars by submerging the commutator in molten solder before the cylinder has been sub-divided into the commutator bars whereby the dressing and truing of the cylinder to produce a perfect cylinder with commutator bars can be accomplished in a single operation as the turning or truing or finishing of the commutator after the same has been sub-divided dresses off the surplus solder and the ends of the lead wire from the armature and provides a perfect connection between the commutator bars and the armature.

Other and further objects and advantages of the invention will be hereinafter set forth and the novel features thereof defined by the appended claims.

In the drawing,

Figure 1 is a perspective view of a portion of a strip of material forming the blank from which the cylinder of the commutator is formed;

Figure 2 is a detail view showing the strip being passed between pressure rolls in order to reduce the central portion approximately .006 of an inch thinner than the edges in order to harden the central portion and to provide soft marginal edges from which the teeth or tongues are stamped;

Figure 3 is a detail perspective view of the strip of metal after it has been passed through the pressure rolls;

Figure 4 is a perspective view of the blank after the tongues or ears have been cut on the side edges;

Figure 5 is a perspective view of a cylinder formed from one of the blanks by rolling the strip until the edges are brought into abutment with one another;

Figure 6 is an end view of the cylinder after the ears or tongues have been bent inwardly;

Figure 7 is a section on line 7—7 of Figure 6;

Figure 8 is a perspective view of the cylinder after it has been filled with a molded body of insulating material;

Figure 9 is a perspective view of the cylinder in which the ears and the marginal edges of the cylinder are provided with slots forming seats for the lead wires;

Figure 10 is a detail elevation showing the lead wires soldered in position within the seats by coating the upper edge of the cylinder with a soldering flux and dipping the cylinder into a molten solder to secure the lead wires in position within the seats;

Figure 11 is the complete commutator and armature of the electric motor after the cuts have been made to produce the commutator bars and the face dressed off to remove the surplus solder and the ends of the wires to form a true commutator; and Figure 12 is a detail elevation showing the commutator constructed in accordance with my invention formed in a slightly different manner, the commutator being formed of a section of a cylinder, the central portion of which has been rolled to increase the hardness.

In carrying out my invention I preferably form the cylinder of the commutator of a blank 1 preferably of copper of the proper length and width to produce the desired size of commutator. The blank thus formed is passed through a series of pressure rolls 2 in order to reduce the central portion of the blank .006 of an inch as shown at 3, which hardens the central portion and leaves the marginal portions 4 and 5 soft and pliable.

The blank thus formed is then cut into the shape as shown in Figure 4 by forming oppositely disposed tongues or ears 6 and 7 out of the marginal portions 4 and 5 and the blank is then rolled into a cylinder by bringing the ends into engagement with one another as shown in Figure 5.

The tongues 6 and 7 are then bent inwardly towards the axis of the cylinder and towards one another as shown at Figures 6 and 7. These tongues it will be noted are bent inwardly towards one another a sufficient distance to form anchors and the cylinder thus formed has molded therein an insulating body 8 with a central opening 9 for the motor shaft as clearly shown in Figure 8.

The next step in the method is forming cuts to provide seats 10 in the marginal portions of the periphery of the cylinder and the inwardly projecting tongues or ears as shown in Figure 9.

The body thus formed is then placed on the armature shaft 11 and the lead wires 12 of the armature 13 are inserted in the seats 10 thus formed and secured by a temporary band 14. A soldering flux is then spread over the upper portion of the cylinder, the lead wires and into the seats. The same is then submerged into molten solder by a specially constructed soldering device which allows the solder to flow over the cylinder without coming in contact with the shaft in order to solder the lead wires securely in position within the the cylinder to form the proper connection between the commutator and armature.

The cylinder is then divided into a plurality of commutator bars 15 by cutting the cylinder longitudinally between the respective tongues or ears as shown at 16 in Figure 11, these cuts being preferably made by a saw and one of the cuts being made at the point of the joint of the ends of the blank which have been turned into contact with one another to form a cylinder.

The cylinder is then dressed in a suitable machine employing sharp cutters so as to turn and form a true cylinder of a plurality of segments of such a hardness that the truing of the cylinder is greatly facilitated whereby I produce a commutator having all of the advantages of the segmental type as by hardening the commutator bars, the wearing face for the brushes is greatly increased and a much truer commutator can be produced by the use of a hard copper and a more perfect truing can be obtained.

In the modification shown in Figure 12 I show a cylinder 17 with ears or tongues 18 and 19 along its ends which are adapted to be bent inwardly towards one another and towards the axis of the cylinder to form anchors for the molded insulating body which is preferably of bakelite and the body portion 20 of the cylinder is preferably hardened by passing pressure rolls over the same to reduce the thickness thereof approximately .006 of an inch whereby a commutator can be formed of hard copper with soft ears or tongues which can be turned inwardly without any danger of breaking the same to provide the necessary anchors for the commutator bars formed therefrom.

While in the drawing I have only shown a portion of an electric motor, I wish it to be clearly understood that my commutator with its novel means of forming the same and connecting the lead wires thereto is capable of being used in connection with various types of electric motors and is especially adapted to be used on small motors manufactured under the Apple patents and therefore I do not wish to limit myself to the use of any particular size and shape of blank or to any particular design of armature as my invention consists broadly in forming a commutator of a plurality of commutator bars with pliable ears or tongues which can be readily bent inwardly without any danger of breaking the same to provide the necessary anchors and the novel means of connecting the lead wires of the armature to the commutator bars whereby a single dressing of the commutator removes the surplus solder and wires and provides a true commutator which enables me to manufacture commutators of this class very cheaply as I am able to dress and true approximately three times as many commutators per tool grind as I was able to dress where soft copper was employed as it is a well known fact in the art of working copper that hard copper is much easier to machine than soft copper and prior to my invention no one had been able to produce commutators under the Apple method with pliable anchoring bars and hard commutator bars.

While in the drawing I have shown certain details of construction, I wish it to be clearly understood that my invention consists in the method of forming a commutator by hardening one portion of a cylinder and allowing the marginal edges of the cylinder to remain soft and pliable to allow this edge to be cut up into ears and bent inwardly to form anchors without any danger of breaking the same.

What I claim is:

1. The method of making a commutator consisting of cutting sheet metal to provide a blank having toothed edges, rolling the body of the blank to harden the metal between the teeth, bending the blank to form a cylinder, bending the teeth inwardly towards the axis of the cylinder to provide anchoring means, molding an insulating body within the cylinder, dividing the cylinder into segments to provide commutator bars and then dressing the face of the cylinder to produce a true commutator.

2. A commutator formed of a cylinder provided with anchoring means of softer material than the cylinder, an insulating body molded within the cylinder, the cylinder being divided into a plurality of segments to produce commutator bars.

3. An electric motor having a commutator formed of a cylinder provided with anchoring means, an insulating body arranged in said cylinder, said cylinder being formed of harder material than the anchoring means, the cylinder being subdivided to produce commutator bars.

4. The method of forming a commutator consisting in forming commutator bars out of a cylinder with anchoring means for each bar, the commutator bar being hardened by placing the same under pressure previous to the forming of the same.

5. The method of forming a commutator consisting in forming a cylinder and hardening the central portion thereof, forming teeth on the edges of the cylinder and bending the same inwardly to form anchoring means and subdividing the cylinder into a plurality of commutator bars, the commutator bars being formed of a harder material than the anchoring means.

ALBERT G. REDMOND.